United States Patent [19]

Gemelli

[11] Patent Number: 4,466,346
[45] Date of Patent: Aug. 21, 1984

[54] GARLIC SQUEEZER, PROVIDED WITH MEANS FOR REMOVING THE SQUEEZED CLOVES

[76] Inventor: Carlo Gemelli, Via P/ta Villa Ada, 16, 28026 - Omegna (Novara), Italy

[21] Appl. No.: 329,662

[22] Filed: Dec. 11, 1981

[30] Foreign Application Priority Data

Feb. 27, 1981 [IT] Italy ............................... 20932/81[U]

[51] Int. Cl.³ ............................................. B30B 9/00
[52] U.S. Cl. .................................. 100/112; D7/101; 99/495; 100/125; 100/234
[58] Field of Search ............... 100/125, 112, 234, 233; 99/495; D7/101, 105

[56] References Cited

U.S. PATENT DOCUMENTS 2,776,616 1/1957 Sarossy ........................... 100/125 X
3,580,168 5/1971 Zysset ................................. 100/234
4,069,752 1/1978 Ahner .............................. 100/125 X Primary Examiner—Billy J. Wilhite
Attorney, Agent, or Firm—Bucknam and Archer

[57] ABSTRACT

The garlic squeezer comprises a first rectilinear arm, pivoted at one end to one end of a second rectilinear or straight arm: on the first arm there is formed, at an intermediate position, an open seat, provided with a perforated bottom, and on the second arm there is formed, at a position corresponding to the open seat, a smooth surface ridge, capable of being inserted into the seat and opposite to a ridge provided with tooth members which may be inserted, from the bottom, into the perforations formed in the bottom of the seat, upon rotating the two arms about the pivot axis.

5 Claims, 2 Drawing Figures

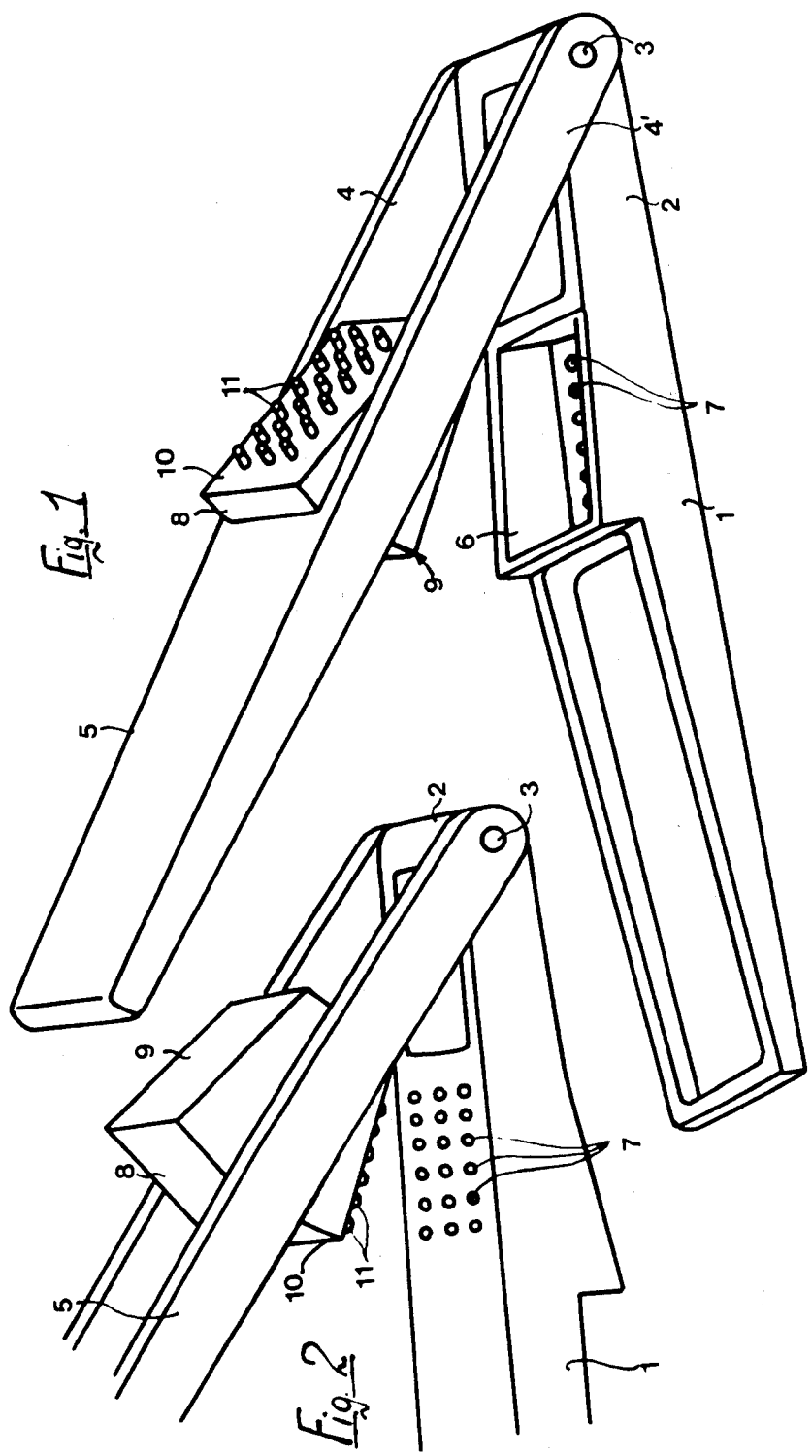

GARLIC SQUEEZER, PROVIDED WITH MEANS FOR REMOVING THE SQUEEZED CLOVES

BACKGROUND OF THE INVENTION

The present invention relates to a garlic squeezer, provided with means for removing the squeezed cloves.

As it is known, some cookery preparations may request the use, in addition to the other ingredients, of garlic juice.

To this end, there are commercially available squeezing tools which are essentially formed by two rotatable arms, which are able of rotating about an intermediate pivot pin, and are so arranged as to present a longer portion, acting as a handle, and a shorter portion, this latter being suitably designed.

The two shorter portions of the two coupled arms respectively practically provide a perforated seat for holding the garlic cloves to be squeezed and a piston member, effective to press said garlic cloves upon applying a suitable manual effort.

The conventional garlic squeezes, on the other hand, are provided, because of their particular design with a power arm of reduced length with respect to the overall length of the arms and accordingly the squeezers do not exploit adequately the applied power.

Moreover, these known garlic squeezers are provided, for removing the squeezed cloves from the squeezing seat or housing, with a projecting shaped member, located at an intermediate position between the fulcrum and the power end of the arm supporting said piston member.

However, the provision of this projecting intermediate member is rather difficult and accordingly also the making operations of this tool are rather complex.

SUMMARY OF THE INVENTION

Thus the object of the present invention is to eliminate the thereinabove mentioned drawbacks by providing such a garlic squeezer which is provided with a power arm of greater length than the conventional garlic squeezers, in such a way as to facilitate the clove squeezing operation.

Within the scope of the thereinabovementioned task, it is an object of the present invention to provide such a garlic squeezer in which the projecting member for removing the squeezed cloves is directly formed at the squeezing piston member.

The object thereinabove indicated, as well as yet other objects which will become more apparent hereinafter are achieved by a garlic squeezer according to the present invention, characterized in that it comprises a first rectilinear arm, pivoted at one end to one end of a second rectilinear arm, on said first rectilinear arm there being formed, at an intermediate position, an open seat provided with a perforated bottom and on the second rectilinear arm there being formed, at a position corresponding to said open seat, a smooth surface ridge, capable of being inserted into the open seat, and a second ridge provided with tooth members capable of being inserted, from the bottom, into these perforations formed in the bottom of said seat, upon completely rotating the two arms about the pivot axis thereof.

BRIEF DESCRIPTION OF THE DRAWING

Further characteristics and advantages of the garlic squeezer according to the present invention will become more apparent from the figures of the accompanying drawing, where:

FIG. 1 is a perspective view illustrating a preferred embodiment of the garlic squeezer, with the smooth surface ridge in position for squeezing the garlic cloves (not shown);

FIG. 2 illustrates that same garlic squeezer with the arms thereof rotated substantially through 360°, in such a way as to bring the toothed ridge to contact the bottom of the clove holding seat or housing.

DESCRIPTION OF THE PREFERRED EMBODIMENT

With reference to the number references of the figures of the accompanying drawing, the garlic squeezer according to the present invention comprises a first arm 1, having a substantially flat cross section. To one end 2 are pivoted, by means of a pivot pin 3, the forked ends 4 and 4' of a second arm 5, of size about the same as the first one.

At an intermediate position of the first arm there is formed an open quadrangular seat 6, through the bottom of which there are formed a plurality of through holes or perforations 7, which are preferably evenly arranged.

At a position corresponding to the seat, on said second arm 5 there is formed a block member 8 projecting above and under said arm and confined by two opposite surfaces, which surfaces converge toward said pivot pin 3.

One of the surfaces, indicated at 9, and facing the seat, is smooth while the opposite surface, indicated at 10, is provided with a plurality of tooth members 11, arranged to register with the holes formed through the bottom of the seat.

It should be pointed out in this respect that the tooth members have a suitably greater length than the thickness of the bottom of said seat.

In view of this feature, by rotating the arm 5 clockwise (as it is shown in FIG. 1), in such a way as to cause the tooth members 11 to be inserted, from the bottom, into the holes or perforations 7, as it is shown in FIG. 2, it is possible to positively remove the squeezed cloves from the seat 6.

From the above description and the figures of the accompanying drawing the great functionality and use facility characterizing the garlic squeezer according to the present invention will be self-evident.

I claim:

1. A squeezer for garlic cloves which comprises a first rectilinear arm (1) and a second rectilinear arm (5), said first rectilinear and second rectilinear arm being pivoted at one end around a pivot pin (3), said first rectilinear arm having a seat, provided with perforations (7) in the bottom thereof, said second rectilinear arm having at a position corresponding to said seat, a block (8,9) which has two portions, one projecting above and one projecting under said second arm, one projecting portion being insertable into said seat when the garlic cloves are squeezed, the other projecting portion being provided with tooth members, said two projecting portions being confined by surfaces which converge towards the pivot pin, said projecting portion, which has teeth, being insertable into said perforations when the cloves are removed after squeezing upon a complete rotation of the first and second arms about said pivot pin.

2. The garlic squeezer according to claim 1 wherein said seat is quadrangular.

3. The garlic squeezer according to claim 1 wherein said tooth members are teeth which are inclined with respect to said second rectilinear arm and have a length greater than the depth of the seat.

4. The garlic squeezer according to claim 1 wherein said first and second arms are of about equal length.

5. The garlic squeezer according to claim 1 wherein said two portions of said block are integral with said second arm.

* * * * *